(12) United States Patent
Martin et al.

(10) Patent No.: US 9,863,208 B2
(45) Date of Patent: Jan. 9, 2018

(54) ISOLATION BARRIER

(71) Applicant: Meta Downhole Limited, Aberdeen (GB)

(72) Inventors: David Glen Martin, Keith (GB); Davidson Harman, Aberdeen (GB); Cameron Radtke, Aberdeen (GB); Peter Wood, Aberdeen (GB); William Luke McElligott, Exeter (GB)

(73) Assignee: MORPHPACKERS LIMITED (GB)

( * ) Notice: Subject to any disclaimer, the term of this patent is extended or adjusted under 35 U.S.C. 154(b) by 14 days.

(21) Appl. No.: 14/918,738

(22) Filed: Oct. 21, 2015

(65) Prior Publication Data
US 2016/0115761 A1  Apr. 28, 2016

(30) Foreign Application Priority Data

Oct. 25, 2014 (GB) .................................. 1419034.2
Jun. 28, 2015 (GB) .................................. 1511310.3

(51) Int. Cl.
*E21B 33/127* (2006.01)
*E21B 23/06* (2006.01)
*E21B 33/12* (2006.01)
*F16J 15/08* (2006.01)

(52) U.S. Cl.
CPC .......... *E21B 33/1277* (2013.01); *E21B 23/06* (2013.01); *E21B 33/1212* (2013.01); *F16J 15/08* (2013.01)

(58) Field of Classification Search
CPC .. E21B 23/06; E21B 33/1212; E21B 33/1277; E21B 33/1208; E21B 33/127
See application file for complete search history.

(56) References Cited

U.S. PATENT DOCUMENTS

| | | | | |
|---|---|---|---|---|
| 480,926 | A * | 8/1892 | Hoadley | E21B 33/1208 166/189 |
| 2,519,116 | A * | 8/1950 | Crake | E21B 33/1212 166/179 |
| 2,624,603 | A * | 1/1953 | Sweet | E21B 33/1208 166/179 |
| 2,835,329 | A * | 5/1958 | True | E21B 33/1208 166/202 |
| 2,922,478 | A | 1/1960 | Maly | |
| 5,743,333 | A * | 4/1998 | Willauer | E21B 33/1277 166/122 |
| 6,640,893 | B1 * | 11/2003 | Rummel | E21B 33/1208 166/187 |
| 7,306,033 | B2 | 12/2007 | Gorrara | |
| 9,475,938 | B2 * | 10/2016 | Drake | C08K 5/053 |
| 2012/0125619 | A1 | 5/2012 | Wood | |

FOREIGN PATENT DOCUMENTS

GB  2398312  8/2004

* cited by examiner

*Primary Examiner* — James G Sayre
(74) *Attorney, Agent, or Firm* — Law Office of Jesse D. Lambert, LLC

(57) ABSTRACT

An assembly having a sleeve member located over a tubular body, there being a chamber between the two and by increased pressure in the chamber the sleeve member is morphed to secure it to a well bore wall and create a seal between the sleeve and well bore wall to form an isolation barrier. The tubular body is formed in one or more sections so that annular planar faces are created for abutment between the sleeve member and the tubular body so as to remove the requirement for complex fittings and reduce the time of construction.

19 Claims, 3 Drawing Sheets

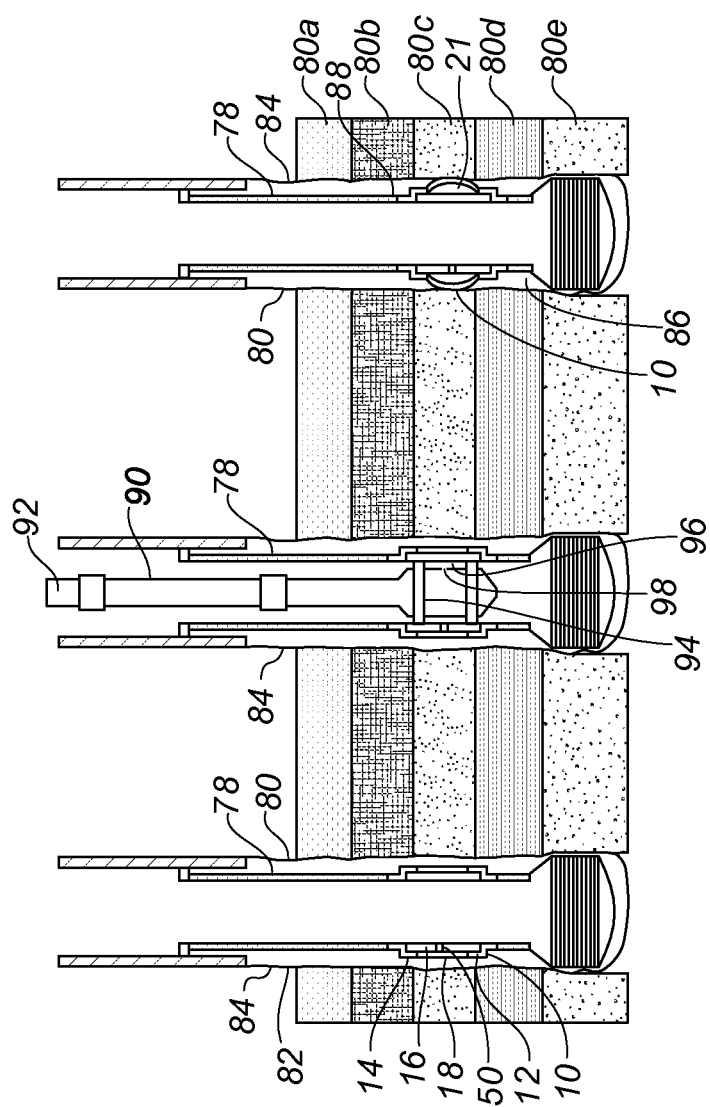

ISOLATION BARRIER

The present invention relates to an apparatus and method for securing a tubular within another tubular or borehole, creating a seal across an annulus in a well bore, centralising or anchoring tubing within a wellbore. In particular, though not exclusively, the invention relates to an assembly in which a sleeve is morphed to secure it to a well bore wall and create a seal between the sleeve and well bore wall to form an isolation barrier.

In the exploration and production of oil and gas wells, packers are typically used to isolate one section of a downhole annulus from another section of the downhole annulus. The annulus may be between tubular members, such as a liner, mandrel, production tubing and casing or between a tubular member, typically casing, and the wall of an open borehole. These packers are carried into the well on tubing and at the desired location, elastomeric seals are urged radially outwards or elastomeric bladders are inflated to cross the annulus and create a seal with the outer generally cylindrical structure i.e. another tubular member or the borehole wall. These elastomers have disadvantages, particularly when chemical injection techniques are used.

As a result, metal seals have been developed, where a tubular metal member is run in the well and at the desired location, an expander tool is run through the member. The expander tool typically has a forward cone with a body whose diameter is sized to the generally cylindrical structure so that the metal member is expanded to contact and seal against the cylindrical structure. These so-called expanded sleeves have an internal surface which, when expanded, is cylindrical and matches the profile of the expander tool. These sleeves work create seals between tubular members but can have problems in sealing against the irregular surface of an open borehole.

The present applicants have developed a technology where a metal sleeve is forced radially outwardly by the use of fluid pressure acting directly on the sleeve. Sufficient hydraulic fluid pressure is applied to move the sleeve radially outwards and cause the sleeve to morph itself onto the generally cylindrical structure. The sleeve undergoes plastic deformation and, if morphed to a generally cylindrical metal structure, the metal structure will undergo elastic deformation to expand by a small percentage as contact is made. When the pressure is released the metal structure returns to its original dimensions and will create a seal against the plastically deformed sleeve. During the morphing process, both the inner and outer surfaces of the sleeve will take up the shape of the surface of the wall of the cylindrical structure. This morphed isolation barrier is therefore ideally suited for creating a seal against an irregular borehole wall.

Such a morphed isolation barrier is disclosed in U.S. Pat. No. 7,306,033, which is incorporated herein by reference. An application of the morphed isolation barrier for FRAC operations is disclosed in US2012/0125619, which is incorporated herein by reference.

FIG. 1 shows a prior art arrangement of an isolation barrier. A metal sleeve A is mounted around a supporting tubular body B, being sealed at each end C,D of the sleeve to create a chamber E between the inner surface of the sleeve and the outer surface of the body. A port F is arranged through the body so that fluid can be pumped into the chamber from the throughbore of the body. The increase in fluid pressure within the chamber causes radial expansion of the sleeve A so that it is morphed onto the wall of the outer larger diameter structure G i.e. casing or open borehole.

To mount the sleeve upon the supporting tubular body requires a complicated arrangement of fittings to provide fixing and sealing of two cylindrical surfaces to each other. An arrangement is disclosed in US2012/0125619 in which an end nut is secured to the tubular body by suitable means. There is then provided a seal section housing which is screwed fast to the end nut and which surrounds a suitable arrangement of seals. The inner most ends of the respective seal section housings are secured to the respective ends of the sleeve by welding. A weld shroud is then provided co-axially about the outer surface of the weld, the respective end of the sleeve and the inner most end of the sealed section housing. The weld shroud is secured to the inner most end of the sealed section housing via a suitable screw threaded connection by welding. This arrangement is expensive and takes considerable time to assemble.

It is therefore an object of at least one embodiment of the present invention to provide a morphed isolation barrier which obviates or mitigates one or more disadvantages of the prior art.

It is a further object of at least one embodiment of the present invention to provide a method of creating an isolation barrier in a well bore which obviates or mitigates one or more disadvantages of the prior art.

According to a first aspect of the present invention there is provided an assembly, comprising:
a tubular body arranged to be run in and secured within a larger diameter generally cylindrical structure;
a sleeve member positioned on the exterior of the tubular body, to create a chamber therebetween;
the sleeve member having first and second ends affixed and sealed to the tubular body;
the tubular body including a port to permit the flow of fluid into the chamber to cause the sleeve member to move outwardly and morph against an inner surface of the larger diameter structure; and characterised in that:
the tubular body comprises one or more tubular sections arranged along a central longitudinal axis;
a first tubular section including a first sidewall thickness part, a second sidewall thickness part adjacent the first sidewall thickness part and a first annular face, the first annular face being perpendicular to the central longitudinal axis;
the first end of the sleeve member including a second annular face, the second annular face being an end face, perpendicular to the central longitudinal axis; and
the first and second annular faces arranged to abut and provide planar surfaces for affixing the first end of the sleeve member to the tubular body at the first tubular section.

In this way, a simple weld can be used to affix one end of the sleeve member to the tubular body and remove the requirement for complex fittings and reduce the time of construction.

Preferably, the first annular face is a first shoulder projecting from an outer surface of the first tubular section. In this way, the first annular face is easily machined on the tubular section.

Preferably, the tubular body comprises a single tubular section. In this way, the sleeve member can be slid over the tubular section until the annular faces meet.

At the second end of the sleeve member a screw thread may be machined on an inner surface of the sleeve member with a complimentary screw thread machined on an outer surface of the tubular section. In this way, the second end of the sleeve member can be affixed to the tubular section.

The tubular body may include a second tubular section, the second tubular section including: a first sidewall thickness part, a second sidewall thickness part adjacent the first sidewall thickness part; a second shoulder projecting from an inner surface of the second tubular section, the second shoulder providing a third annular face perpendicular to the central longitudinal axis; and a fourth annular face being an end face of the second tubular section, the fourth annular face being perpendicular to the central longitudinal axis.

Preferably, the sleeve member is a tubular body having first and second ends with the second annular face at the first end and a fifth annular face at the second end, the second and fifth annular faces being end faces, perpendicular to the central longitudinal axis. In this way, the sleeve member is easily manufactured.

The first tubular section may include an elongate section extending from the first shoulder, the elongate section having a sixth annular face being and end face, perpendicular to the central longitudinal axis.

Preferably, the sleeve member is located over the first tubular section and the first annular face of the first tubular section affixed to the second annular face of the sleeve member, the second tubular section is located over the first tubular section with the third annular face of the second tubular member affixed to the sixth annular face of the first tubular section, and the fifth annular face of the sleeve member is affixed to the fourth annular face of the second tubular section.

The first tubular section may include a third shoulder projecting from an inner surface of the first tubular section, the third shoulder providing a seventh annular face perpendicular to the central longitudinal axis and wherein the first annular face is an end face of the first tubular section.

There may be a third tubular section, the third tubular section being a support pipe having annular end faces to provide eighth and ninth annular faces respectively.

Preferably, the first tubular section is arranged over the third tubular section to lie in the third shoulder with the seventh and eighth annular faces affixed together; the sleeve member is located over the third tubular section to meet with the first tubular section and the first and second annular faces affixed together; and the second tubular section is located on over an end of the third tubular section with the fourth and fifth annular faces being affixed together and the third and ninth annular faces being affixed together.

In this way, the tubular sections can be manufactured in a stiff metal and the sleeve member made of a softer metal more suitable for morphing. All joints are advantageously between planar surfaces providing easier and faster construction of the assembly.

The sleeve member and the second tubular section may be of single part construction i.e. without a joint at the fourth and fifth annular faces. In this way a two part construction is formed.

Preferably, the annular faces are affixed together by a weld. More preferably the weld is an e-beam weld.

There may be screw threaded connections between the tubular sections and between the tubular sections and the sleeve member. Such screw threaded connections assist in strengthening the assembly but do not provide an adequate seal as can be achieved with the weld.

Preferably the sleeve member has a reduced outer diameter over a central portion thereof. In this way, the ends of the sleeve member can be thicker walled to increase the area for connection to the end members while providing a thin walled portion for ease of morphing.

The large diameter structure may be an open hole borehole, a borehole lined with a casing or liner string which may be cemented in place downhole, or may be a pipeline within which another smaller diameter tubular section requires to be secured or centralised.

Preferably the port includes a valve. More preferably, the valve is a one-way check valve. In this way, fluid is prevented from exiting the chamber between the sleeve member and the supporting tubular body following morphing to support the seal against the larger diameter structure. Advantageously, the valve includes a ruptureable barrier device, such as a burst disk device or the like. Preferably the barrier device is set to rupture at a pressure for morphing to begin. In this way, fluids can be pumped down the tubing string into the well without fluids entering the sleeve until it is desirous to operate the sleeve.

The sleeve member may be manufactured from metal which undergoes elastic and plastic deformation. The sleeve member is preferably formed from a softer and/or more ductile material than that used for the supporting tubular body. Suitable metals for manufacture of the sleeve member include certain types of steel. Further, the sleeve member may be provided with a deformable coating such as an elastomeric coating which may be configured as a single coating or multiple discreet bands. In this latter preferred embodiment, the elastomer bands are spaced such that when the sleeve is expanded the bands will contact the inside surface of the open borehole first. The sleeve member will continue to expand outwards into the spaces between the bands, thereby causing a corrugated effect on the sleeve member. These corrugations provide a great advantage in that they increase the stiffness of the sleeve member and increase its resistance to collapse forces.

According to a second aspect of the present invention there is provided a method of setting a morphed sleeve in a well bore, comprising the steps:

(a) locating an assembly according to the first aspect in a tubular string;
(b) running the tubular string into a wellbore and positioning the sleeve member at a desired location within a larger diameter structure;
(c) pumping fluid through the tubular string and increasing the fluid pressure;
(d) opening a valve in the supporting tubular body to allow fluid to enter between the outer surface of the supporting tubular body and the inner surface of the sleeve member; and
(e) continuing to pump fluid to cause the sleeve to move radially outwardly and morph against an inner surface of the larger diameter structure.

In this way, the assembly of the first aspect creates an isolation barrier within a well bore.

The larger diameter structure may be an open hole borehole, a borehole lined with a casing or liner string which may be cemented in place downhole, or may be a pipeline within which another smaller diameter tubular section requires to be secured or centralised.

Preferably, the method includes the step of passing the fluid through a valve at the port. In this way, fluid flow into and out of the space between the sleeve member and the supporting tubular body can be controlled.

Preferably, the method includes the further step of rupturing a disc at the valve to allow fluid to enter the space when the pressure reaches a desired value. This allows pumping of fluids into the well without fluid entering the sleeve member.

The method may include the steps of running in a hydraulic fluid delivery tool, creating a temporary seal above and below the port to isolate a space and injecting fluid from the tool into the space to morph the sleeve member. Such an arrangement allows selective operation of the sleeve member if more than one sleeve member is arranged in the well bore.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the accompanying drawings of which:

FIGS. 6a-c are schematic illustrations of a sequence for setting a sleeve member in an open borehole;

FIG. 6a is a cross-sectional view of a tubular string provided with an assembly according to the present invention;

FIG. 6b shows the tubular string in the borehole of FIG. 6a with a hydraulic fluid delivery tool inserted therein; and FIG. 6c is a cross-sectional view of the tubular string of FIGS. 6a and 6b with a morphed sleeve, in use.

Figure 1:
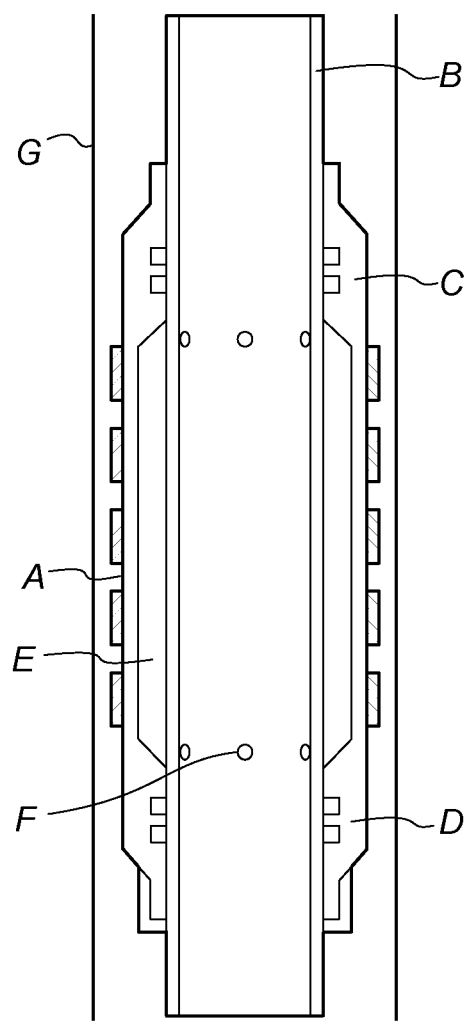
FIG. 1 is a cross-sectional view through an isolation barrier according to the prior art.
Figure 2:
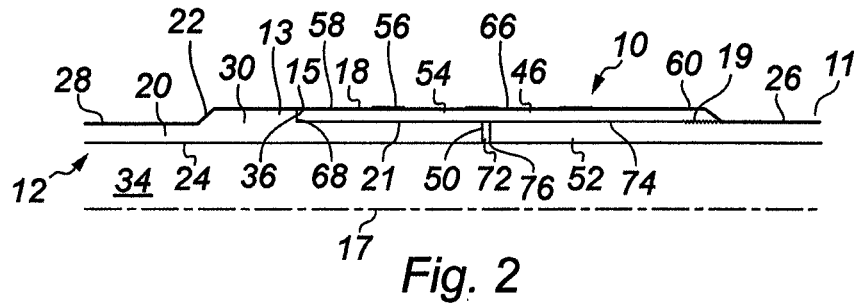
FIG. 2 is a part cross-sectional view through an assembly according to an embodiment of the present invention.

Reference is initially made to FIG. 2 of the drawings which illustrates an assembly, generally indicated by reference numeral 10, including tubular body 11 comprising a tubular section 12 and sleeve member 18, according to an embodiment of the present invention.

In this embodiment, the tubular body 11 comprises a single, tubular section 12. Tubular section 12 has a substantially cylindrical body 20 providing an outer surface 22, an inner surface 24, a first end 26 and a second end 28. The first end 26 will have a traditional pin section for connecting the body 11 into a string of pipe, casing or liner. The second end 28 will have a traditional box section for connecting the body 11 into a string of pipe, casing or liner. Towards the second end 28, a portion 30 of the section 12 has a side wall thickness greater than that on either side, producing a rim 13 around the circumference of the tubular section 12. The rim 13 has an outer diameter greater than the diameter of the inner surface 24 and the outer surface 22. On the first side 26 of the rim 13, a shoulder 15 is formed. The shoulder 15 provides an annular ledge on the outer surface 22 of the tubular section 12. The shoulder 15 can be seen as an annular face 36 extending around the circumference of the tubular member 12, facing the first end 26. The annular face 36 is perpendicular to the outer surface 22, the inner surface 24 and to a longitudinal axis 17 which is centrally located in the throughbore 34 of the tubular body 11. The annular face 36 presents a ring-shaped planar surface.

The body 20 of the tubular section 12 from the shoulder 15 towards the first end 26 is located coaxially within the sleeve member 18. The inner diameter of the sleeve member 18 is just greater than the outer diameter at outer surface 46 of the first tubular section 12 so that it only has sufficient clearance to slide over the section 12 during assembly. Sleeve member 18 is a steel cylinder being formed from typically 316L or Alloy 28 grade steel but could be any other suitable grade of steel or any other metal material or any other suitable material which undergoes elastic and plastic deformation. Ideally the material exhibits high ductility i.e. high strain before failure. The sleeve member 18 is appreciably thin-walled of lower gauge than the first tubular section 12 and is preferably formed from a softer and/or more ductile material than that used for the first tubular section 12. The sleeve member 18 may be provided with a non-uniform outer surface 54 such as ribbed, grooved or other keyed surface in order to increase the effectiveness of the seal created by the sleeve member 18 when secured within another casing section or borehole.

At the first end 26 of the tubular section 12 the sleeve member 18 is coupled to the section 12 by a screw thread coupling 19. A seal will also be used (not shown). The coupling 19 may be as used in the prior art and described in the background section of this description.

Although not shown, portions at the first and second ends 58,60 of the sleeve member 18, may have a thicker side wall. This leaves a thinner walled central portion 66. In such an arrangement the central portion 66 will morph prior to the ends 58,60.

An elastomer 56 or other deformable material is bonded to the outer surface 54 of the sleeve 18; this may be as a single coating but is preferably a multiple of bands with gaps therebetween as shown in the Figure. The bands or coating may have a profile or profiles machined into them. In this embodiment, the elastomer bands 56 are spaced such that when the sleeve 18 is being morphed the bands 56 will contact the inside surface of the larger diameter structure first. The sleeve member 18 will continue to expand outwards into the spaces between the bands 56, thereby causing a corrugated effect on the sleeve member 18. These corrugations provide a great advantage in that they increase the stiffness of the sleeve member 18 and increase its resistance to collapse forces.

The first end 58 of the sleeve member 18 has an annular end face 68 which is perpendicular to the central longitudinal axis 17. The end face 68 is sized and arranged to abut the end face 36 of the first tubular section 12. An e-beam weld is made between the faces 68,36 to attach the sleeve member 18 to the tubular section 12. Those skilled in the art will appreciate that other connections can be made to affix the sleeve member 18 to the tubular section 12. As the faces 68,36 are planar and parallel to each other, the connection is easier than attempting a connection over a cylindrical surface.

A port 50 is provided through the side wall 52 of the section 12 to provide a fluid passageway between the throughbore 34 and the outer surface 46 of the section 12. This accesses a chamber 21 between the outer surface 46 of the section 12 and the inner surface 74 of the sleeve member 18. While only a single port 50 is shown, it will be appreciated that a set of ports may be provided. These ports may be equidistantly spaced around the circumference of the side wall 52 and/or be arranged along the body 20 between the first end 58 and the second end 60 locations of the sleeve member 18.

At the port 50 there is located a check valve 72. The check valve 72 is a one-way valve which only permits fluid to pass from the throughbore 34 into the chamber 21. The check valve 72 can be made to close when the sleeve member 18 has been morphed, which can be identified by a lack of flow through the annulus between the assembly 10 and the larger diameter structure. Closure can be effected by bleeding off the valve 72. Also arranged at the port 50 is a rupture disc 76. The rupture disc 76 is rated to a pressure below, but close to the morphed pressure value. In this way, the rupture disc 76 can be used to control when the setting of the sleeve 18 is to begin. The disc 76 can be operated by increasing pressure in the throughbore 34 towards a predetermined pressure value suitable for morphing the sleeve 18, but will prevent fluid exiting the throughbore 34 through the port 50 until this pressure value occurs.

Figure 3:
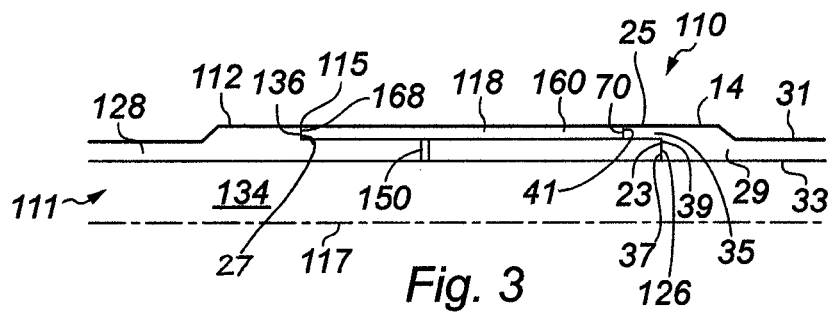
FIG. 3 is a part cross-sectional view through an assembly according to a further embodiment of the present invention.

Reference is now made to FIG. 3 of the drawings which illustrates an assembly, generally indicated by reference numeral 110, including tubular body 111 comprising a first and second tubular sections 112,14 and sleeve member 118, according to an embodiment of the present invention. Like parts, to those of FIG. 2, have been given the same reference numeral with the addition of '100'.

In this embodiment, the first tubular section 112 is shortened so that the first end 126 terminates with an annular face 23 which is arranged to be perpendicular to the central longitudinal axis 117. The sleeve member 118 also has an annular face 70 which is arranged to be perpendicular to the central longitudinal axis 117 at its second end 160. The tubular body 111 now has two tubular sections 112,14.

Tubular section 14 forms an end member to the body 111. Tubular section 14 has a substantially cylindrical body 29 providing an outer surface 31, an inner surface 33, a first end 25 and a second end 27. At the first end 25, the diameter of the inner surface 33 is increased over a portion 35 of the length of the tubular section 14. This has the effect of removing a piece of material so that, the portion 35 ends at a shoulder 37 on the tubular section 14. The shoulder 37 provides an annular ledge in the throughbore 134 of the tubular section 14 which is perpendicular to the inner surface 33. This provides an annular end face 39 which is planar and perpendicular to the central longitudinal axis 117. At the first end 25 there is also an annular end face 41 which is perpendicular to the inner surface 33. The portion 35 may have a screw thread machined into its surface so that the first end 25 acts as a female coupling. The second end 27 has a standard pin coupling for attaching the tubular body 111 into a tubular string of pipe such as casing or liner. Tubular section 14 will be constructed of the same material as tubular section 112.

The assembly 110 is formed in the same manner as assembly 10 with the addition of the second tubular section 14 as an end piece. When the tubular section 14 is slid over the first end 126 of the first tubular section 112, the annular faces 70,41 between the sleeve member 118 and the section 14 will meet and can be affixed by a weld, such as an e-beam weld. Similarly, the annular faces 23,39 between the first and second sections 112,14 will meet and can be affixed by a weld or other coupling means.

In this embodiment, the sleeve member 18 is firmly held in position and the entire assembly 110 is of three part construction.

Figure 4:
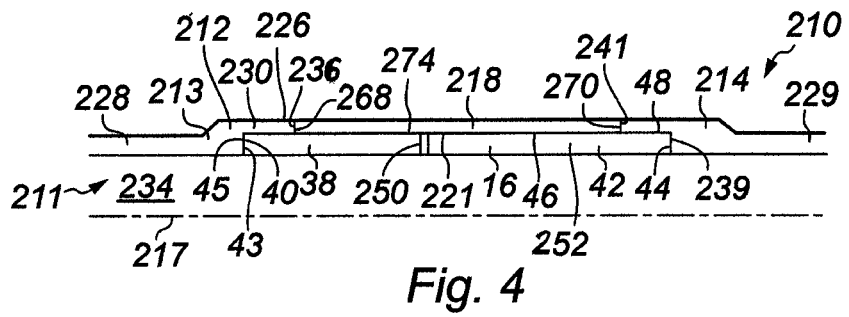
FIG. 4 is a part cross-sectional view through an assembly according to a yet further embodiment of the present invention.

Reference is now made to FIG. 4 of the drawings which illustrates an assembly, generally indicated by reference numeral 210, including tubular body 211 comprising a first and second tubular sections 212,214 and sleeve member 218, according to an embodiment of the present invention. Like parts, to those of FIGS. 2 and 3, have been given the same reference numeral with the addition of '200'.

In this embodiment, the tubular sections 212,214 are identical and formed as for the description of tubular section 14, except that a second end 228 of the tubular section 212 has a box section and a second end 229 of the tubular section 214 has a pin section so that the body 211 can be part of a tubular string of pipe such as casing or liner.

The annular face 236 of tubular section 212 is now at the first end 226. A shoulder 43 is located under the rim 213 providing an annular face 45 facing the tubular section 214 which is perpendicular to the central longitudinal axis 217.

The third tubular section 16 is a cylindrical tubular body having at a first end 38, a first annular end face 40 and at an opposite, second end 42, a second end face 44. At each end 38,42 the outer surface 46 of the tubular section 16 has a portion 48 similar in length to the portion 230 of the tubular sections 212,214 which has a screw thread machined into its surface. The ends 38,42 act as male couplings. The screw thread on the ends 38,42 is complimentary to the screw thread of the tubular sections 212,214 so that the tubular section 16 can be coupled to the tubular sections 212,214 and thereby provide a continuous tubular section, tubular body 211. Each end 38,42 can be made-up to the respective end 226,229 of each tubular section 212,214 so that the first and second annular end faces 40,44 abut the shoulders 43,37 on the tubular sections 212,214. In this way, axial load is transferred directly through the assembly using the tubular section 16.

The port 250 is provided through the side wall 252 of the section 16 to provide a fluid passageway between the throughbore 234 and the chamber 221. The chamber is now created between the outer surface 46 of the section 16 and the inner surface 274 of the sleeve member 218.

The third tubular section 16 is formed of the same material as the tubular sections 212,214. The port 150 and its arrangement is as for FIG. 2 as is the arrangement and additional features which may be found on the sleeve member 218.

Assembly 210 is made-up by locating the first end 38 of the third tubular section 16 against the shoulder 37 of the first tubular section 212. If there is a screw thread coupling this can be used. The annular faces 40,45 abut and are secured and sealed together. The sleeve member 218 is then located coaxially over the tubular section 16 so that annular faces 236,268 abut and are secured and sealed together. The second tubular section 214 is then located over the second end 42 of the third tubular section 16, which again may be by coupling of screw threads. The annular surfaces 270,241 abut and are secured and sealed to provide the made-up assembly 210.

Figure 5:
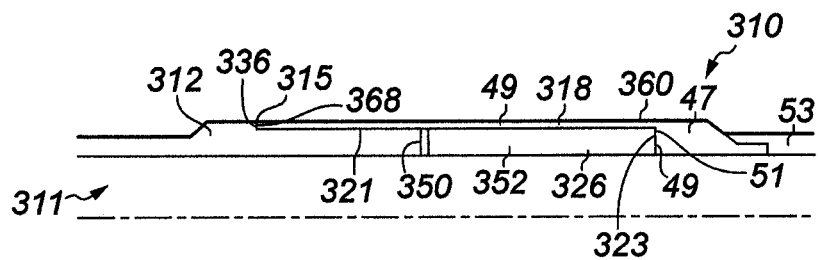
FIG. 5 is a part cross-sectional view through an assembly according to a still further embodiment of the present invention.

Reference is now made to FIG. 5 of the drawings which illustrates an assembly, generally indicated by reference numeral 310, including tubular body 311 comprising a first and second tubular sections 112,47 and sleeve member 118, according to an embodiment of the present invention. Like parts, to those of FIGS. 2 and 3, have been given the same reference numeral with the addition of '300'.

In this embodiment, the first tubular section 112 is the same as tubular section 112, described at FIG. 3, except that the shoulder 315 is now not as deep, providing a narrower annular face 336. This is to thicken the side wall 352. It is also done as a sleeve portion 49 of the sleeve member 318 is thinner over the side wall 352 so that it morphs more easily. The sleeve member 318 now has a tubular section 47 attached at the second end 360, being integral with the sleeve portion 49 and made of the same material. Tubular section 47 is as described for tubular section 14 in FIG. 2, providing an annular face 51 for affixing to the annular face 323 at the first end 326 of the tubular section 312.

As the material of the sleeve member 316 may be more ductile than that of the tubular section 312, there is a further tubular section 53 connected to the section 47 to provide a stringer coupling to the string of casing or liner in which the tubular body 311 will be inserted in. Alternatively, the sleeve member 318 may be made of the same material as that of the tubular section 312, but the sleeve portion 49 must then have a thickness suitable which allows the portion to be morphed under pressure through the port 350 into chamber 332.

Reference will now be made to FIG. 6A of the drawings which provides an illustration of the method for setting a sleeve within a well bore according to an embodiment of the present invention. Like parts to those in FIG. 2 have been given the same reference numerals to aid clarity, though the method described applies equally to the embodiments in FIGS. 3, 4 and 5.

In use, the assembly 10 is conveyed into the borehole by any suitable means, such as incorporating the assembly 10 into a casing or liner string 78 and running the string into the wellbore 82 until it reaches the location within the open borehole 80 at which operation of the assembly 10 is intended. This location is normally within the borehole at a position where the sleeve 18 is to be expanded in order to, for example, isolate the section of borehole 80b located above the sleeve 18 from that below 80d in order to provide an isolation barrier between the zones 80b,80d.

While only a single assembly 10 is shown on the string 78, further assemblies may be run on the same string 78 so that zonal isolation can be performed in a zone 80 in order that an injection, frac'ing or stimulation operation can be performed on the formation 80a-e located between two sleeves.

Each sleeve 18 can be set by increasing the pump pressure in the throughbore 34 to a predetermined value which represents a pressure of fluid at the port 50 being sufficient to morph the sleeve 18. This morphed pressure value will be calculated from knowledge of the diameter of the tubular body 11, the approximate diameter of the borehole 80 at the sleeve 18, the length of the sleeve 18 and the material and thickness of the sleeve 18. The morphed pressure value is the pressure sufficient to cause the sleeve 18 to move radially away from the body 11 by elastic expansion, contact the surface 84 of the borehole and morph to the surface 84 by plastic deformation.

When the morphed pressure value is applied at the port 50, the rupture disc 76 will have burst as it is set below the morphed pressure value. The check valve 72 is arranged to allow fluid from the throughbore 34 to enter the space between the outer surface 46 of the tubular section 12 and the inner surface 74 of the sleeve member 18. This fluid will increase pressure in the space and against the inner surface 74 of the sleeve 18 so as to cause the sleeve 18 to move radially away from the body 16 by elastic expansion, contact the surface 82 of the borehole and morph to the surface 82 by plastic deformation. When the morphing has been achieved, the check valve 72 will close and trap fluid at a pressure equal to the morphed pressure value within the a chamber 21 created between the outer surface 46 of the tubular section 12 and the inner surface 74 of the sleeve member 18.

The sleeve 18 will have taken up a fixed shape under plastic deformation with an inner surface 74 matching the profile of the surface 82 of the borehole 80, and an outer surface also matching the profile of the surface 82 to provide a seal which effectively isolates the annulus 88 of the borehole 80 above the sleeve 18 from the annulus 86 below the sleeve 18. If two sleeves are set together then zonal isolation can be achieved for the annulus between the sleeves. At the same time the sleeves have effectively centered, secured and anchored the tubing string 78 to the borehole 80.

An alternative method of achieving morphing of the sleeve 18 is shown in FIG. 6B. This method uses a hydraulic fluid delivery tool 90. Once the string 78 reaches its intended location, tool 90 can be run into the string 78 from surface by means of a coiled tubing 92 or other suitable method. The tool 90 is provided with upper and lower seal means 94, which are operable to radially expand to seal against the inner surface 24 of the tubular body 11 at a pair of spaced apart locations in order to isolate an internal portion of body 11 located between the seals 94; it should be noted that said isolated portion includes the fluid port 50. Tool 90 is also provided with an aperture 98 in fluid communication with the interior of the string 78.

To operate the tool 90, seal means 94 are actuated from the surface to isolate the portion of the tool body 16. Fluid, which is preferably hydraulic fluid, is then pumped under pressure, which is set to the morphed pressure value, through the coiled tubing such that the pressurised fluid flows through tool aperture 98 and then via port 50 into the space between the outer surface 46 of the tubular body 11 and the inner surface 74 of the sleeve member 18 and acts in the same manner as described hereinbefore. Once the morph is complete the seals 94 can be deactivated and the tool 90 pulled out of the well bore 82.

A detailed description of the operation of such a hydraulic fluid delivery tool 88 is described in GB2398312 in relation to the packer tool 112 shown in Figure. 27 with suitable modifications thereto, where the seal means 92 could be provided by suitably modified seal assemblies 214, 215 of GB2398312, the disclosure of which is incorporated herein by reference. The entire disclosure of GB2398312 is incorporated herein by reference.

Using either pumping method, the increase in pressure of fluid directly against the sleeve 18 causes the sleeve 18 to move radially outwardly and seal against a portion of the inner circumference of the borehole 80. The pressure against the inner surface 74 of the sleeve 18 continues to increase such that the sleeve 18 initially experiences elastic expansion followed by plastic deformation. The sleeve 18 expands radially outwardly beyond its yield point, undergoing plastic deformation until the sleeve 18 morphs against the surface 82 of the borehole 80 as shown in FIG. 6C. If desired, the pressurised fluid within the space can be bled off following plastic deformation of the sleeve 18. Accordingly, the sleeve 18 has been plastically deformed and morphed by fluid pressure without any mechanical expansion means being required.

When the morphing has been achieved, the check valve 72 can be made to close and trap fluid at a pressure equal to the morphed pressure value within the space between the outer surface 46 of the tubular body 11 and the inner surface 74 of the sleeve member 18.

The principle advantage of the present invention is that it provides an assembly for creating an isolation barrier in a well bore which is less expensive and easier to assemble than the prior art isolation barriers.

A further advantage of the present invention is that it provides a method for setting a sleeve in a well bore which uses a simplified isolation barrier.

It will be apparent to those skilled in the art that modifications may be made to the invention herein described without departing from the scope thereof. For example, while a morphed pressure value is described this may be a pressure range rather than a single value to compensate for variations in the pressure applied at the sleeve in extended well bores. The connection between the sleeve and end members can be by other means such as screw threads and alternative welding techniques. The end faces need not be exactly perpendicular to the central longitudinal axis but may be tapered or of any profile which matches that of the opposing face.

The invention claimed is:

1. An assembly, comprising:
a metal tubular body arranged to be run in and secured within a larger diameter generally cylindrical structure;
a metal sleeve member positioned on the exterior of the metal tubular body, to create a chamber therebetween;
the metal sleeve member having first and second ends affixed and sealed to the metal tubular body;
the metal tubular body including a port to permit the flow of fluid into the chamber to cause the metal sleeve member to move outwardly and morph against an inner surface of the larger diameter structure; and wherein:
the metal tubular body comprises one or more metal tubular sections arranged along a central longitudinal axis;
a first metal tubular section including a first sidewall thickness part, a second sidewall thickness part adjacent the first sidewall thickness part and a first annular face, the first annular face being perpendicular to the central longitudinal axis; wherein the metal tubular body includes a second metal tubular section, the second metal tubular section including a first sidewall thickness part, a second sidewall thickness part adjacent the first sidewall thickness part; a second shoulder projecting from an inner surface of the second metal tubular section, the second shoulder providing a third annular face perpendicular to the central longitudinal axis; and a fourth annular face being an end face of the second metal tubular section, the fourth annular face being perpendicular to the central longitudinal axis;
the first end of the metal sleeve member including a second annular face, the second annular face being an end face, perpendicular to the central longitudinal axis; and
the first and second annular faces arranged to contact one another and provide planar surfaces for affixing the first end of the metal sleeve member to the metal tubular body at the first metal tubular section.

2. An assembly according to claim 1 wherein the first annular face is a first shoulder projecting from an outer surface of the first metal tubular section.

3. An assembly according to claim 1 wherein the metal tubular body comprises a single metal tubular section.

4. An assembly according claim 1 wherein at the second end of the metal sleeve member a screw thread is machined on an inner surface of the metal sleeve member with a complimentary screw thread machined on an outer surface of the metal tubular section.

5. An assembly according to claim 1 wherein the metal sleeve member is a metal tubular body having first and second ends with the second annular face at the first end and a fifth annular face at the second end, the second and fifth annular faces being end faces, perpendicular to the central longitudinal axis.

6. An assembly according to claim 5 wherein the first metal tubular section includes an elongate section extending from the first shoulder, the elongate section having a sixth annular face being an end face, perpendicular to the central longitudinal axis.

7. An assembly according to claim 6 wherein the metal sleeve member is located over the first metal tubular section and the first annular face of the first tubular section affixed to the second annular face of the metal sleeve member, the second metal tubular section is located over the first metal tubular section with the third annular face of the second tubular member affixed to the sixth annular face of the first tubular section, and the fifth annular face of the metal sleeve member is affixed to the fourth annular face of the second metal tubular section.

8. An assembly according to claim 7 wherein the first metal tubular section includes a third shoulder projecting from an inner surface of the first metal tubular section, the third shoulder providing a seventh annular face perpendicular to the central longitudinal axis and wherein the first annular face is an end face of the first metal tubular section.

9. An assembly according to claim 8 wherein there is a third metal tubular section, the third metal tubular section being a support pipe having annular end faces to provide eighth and ninth annular faces respectively.

10. An assembly according to claim 9 wherein the first metal tubular section is arranged over the third metal tubular section to lie in the third shoulder with the seventh and eighth annular faces affixed together; the metal sleeve member is located over the third tubular section to meet with the first tubular section and the first and second annular faces affixed together; and the second tubular section is located on over an end of the third tubular section with the fourth and fifth annular faces being affixed together and the third and ninth annular faces being affixed together.

11. An assembly according to claim 1 wherein the metal sleeve member and the second tubular section are of single part construction.

12. An assembly according to claim 1 wherein the annular faces are affixed together by a weld.

13. An assembly according to claim 12 wherein the weld is an e-beam weld.

14. An assembly according to claim 1 wherein the metal sleeve member has a reduced outer diameter over a central portion thereof.

15. An assembly according to claim 1 wherein the large diameter structure is selected from a group comprising: an open hole borehole, a borehole lined with a casing, a borehole lined with a liner string and a pipeline within which another smaller diameter tubular section requires to be secured or centralised.

16. An assembly according to claim 1 wherein the port includes a valve.

17. An assembly according to claim 1 wherein the metal sleeve member is provided with an elastomeric coating.

18. An assembly according to claim 17 wherein the elastomeric coating is configured as one or more discreet bands.

19. A method of setting a morphed metal sleeve in a well bore, comprising the steps:
   (a) locating an assembly according to claim 1 in a tubular string;
   (b) running the tubular string into a wellbore and positioning the metal sleeve member at a desired location within a larger diameter structure;
   (c) pumping fluid through the tubular string and increasing the fluid pressure;
   (d) opening a valve in the supporting metal tubular body to allow fluid to enter between the outer surface of the supporting metal tubular body and the inner surface of the metal sleeve member; and
   (e) continuing to pump fluid to cause the metal sleeve to move radially outwardly and morph against an inner surface of the larger diameter structure.

* * * * *